United States Patent Office 3,547,837
Patented Dec. 15, 1970

3,547,837
POLYVINYL FORMAL POROUS PRODUCTS OBTAINED FROM AQUEOUS SOLUTIONS OF ZINC CHLORIDE OR ACETIC ACID
Tadao Ashikaga, Hirotoshi Kurashige, and Takeo Endoh, Kurashiki-shi, Japan, assignors to Kurashiki Rayon Co., Ltd., Kurashiki-shi, Okayama Prefecture, Japan, a corporation of Japan
No Drawing. Filed Aug. 19, 1966, Ser. No. 573,467
Claims priority, application Japan, Aug. 25, 1965, 40/51,852
Int. Cl. C08f 47/08; C08j 1/16
U.S. Cl. 260—2.5
10 Claims

ABSTRACT OF THE DISCLOSURE

A process for the production of polyvinyl formal porous products using aqueous solutions of zinc chloride or acetic acid is disclosed. The solubility of polyvinyl formal in such solutions allows foaming to be effected before, during or after the reaction of polyvinyl alcohol with formaldehyde.

---

This invention relates to a process for producing polyvinyl formal porous products.

Polyvinyl formals are described in many patents, e.g., British Pat. No. 351,082, U.S. Pat. No. 1,955,086, and U.S. Pat. No. 2,129,449. In general, these polymers are prepared by condensing a polyvinyl alcohol, obtained by hydrolysis of a polyvinyl ester in acid or alkaline media, with formaldehyde in the presence of a mineral acid catalyst.

A process hitherto known for the production of polyvinyl formal porous products consists of gradually effecting formalization of polyvinyl alcohol, that is, condensation of polyvinyl alcohol with formaldehyde, by the addition of an acid catalyst and formaldehyde to an aqueous solution of polyvinyl alcohol, to thereby obtain porous polyvinyl formal which precipitates as the result of the reaction on the bottom of the reaction vessel. In the method, the resulting porous products are improved in quality through an increase in the degree of porosity by the addition to the reaction mixture of starches which decompose in the presence of acid to generate carbon dioxide gas.

In the aforementioned formalization reaction of polyvinyl alcohol, the polyvinyl formal formed settles to the bottom of the reaction vessel because of its insolubility in water. Unless the precipitation is allowed to occur slowly, a porous body having good properties and agreeable touch will not result. In order to obtain porous products of polyvinyl formal by the conventional process, it is therefore necessary to permit polyvinyl alcohol to be formalized over an extended period of about 10 to 20 hours. Efforts to streamline production and curtail manufacturing costs, as, for instance, by shortening the production cycle have encountered considerable difficulties.

Thus, it is an object of the present invention to produce porous products of polyvinyl formal by a novel process.

Another object of the invention is to produce polyvinyl formal porous products quickly, continuously and at low cost.

Still another object of the invention is to provide polyvinyl formal porous products containing filler, which are adapted for use as building materials.

The above objects are attained by a process which comprises formalizing polyvinyl alcohol in an aqueous solution containing a formalizing agent, a formalizing catalyst and a substance selected from the group consisting of zinc chloride and acetic acid, to provide a flowable polyvinyl formal solution containing fine foam or bubbles, and thereafter bringing the flowable, foam-containing polyvinyl formal solution into contact with an aqueous coagulating liquid to coagulate the polyvinyl formal.

Although insoluble in water, polyvinyl formal readily dissolves in aqueous solutions of zinc chloride or acetic acid, regardless of the degree of formalization. Under the invention, therefore, formalization of polyvinyl alcohol is effected in an aqueous solution containing a formalizing agent, a formalizing catalyst and zinc chloride or acetic acid. The polyvinyl formal formed dissolves in the aqueous solution so that the formalization reaction proceeds in a homogeneous system. After formalization, the reaction mixture is obtained in the form of a homogeneous viscous solution. The formalized polyvinyl formal has at least 40% of the hydroxy groups of the polyvinyl alcohol starting material condensed with formaldehyde.

The term "polyvinyl alcohol" as used herein, means not only completely saponified polyvinyl esters and partially saponified polyvinyl esters which are obtained by hydrolysis of polyvinyl esters in acid or alkali media, but also those saponified polyvinyl esters which are slightly acetalized, etherified or urethanized, and saponified products of copolymers of vinyl esters and copolymerizable monomers. It is defined and described in more detail in Franz Kainer: "Polyvinylalkole" (Ferdinand Enke Verlag, 1949). In short, the "polyvinyl alcohol" as used under the invention means a solid polymer having a polymerization degree of at least 500 and preferably containing vinyl alcohol units in the range of 90 to 100 molar percent. It is insignificant to put an upper limit to the degree of polymerization.

The formalizing agents and formalizing catalyst of the invention include those commonly used in the formalization of polyvinyl alcohol.

The formalizing agents include, for example, formalin and formaldehyde-generative substances, such as, trioxane, paraformaldehyde and polyoxymethylene glycols having a polymerization degree of up to about 2000. Formalizing catalysts include organic acids such as formic acid, oxalic acid, acetic acid and the like and inorganic acids such as hydrochloric acid, nitric acid, sulfuric acid, phosphoric acid and the like. The preferred catalysts are hydrochloric acid and sulfuric acid.

In the formalization of polyvinyl alcohol, the concentrations of polyvinyl alcohol, formalizing agent, catalyst and zinc chloride or acetic acid may be suitably selected depending upon the desired viscosity of the polyvinyl formal solution obtained after the reaction and upon the degree of formalization of polyvinyl formal. Preferably, polyvinyl alcohol in a concentration of about 5 to 25% by weight may be formalized in an aqueous solution containing about 1 to 10 wt. percent formalizing agent, about 2 to 12 wt. percent formalizing catalyst and about 30 to 70 wt. percent zinc chloride or acetic acid. The formalizing temperature is, preferably, about 40 to 85° C.

In the practice of the invention, the foaming may be effected either before, during or after the formalization reaction. For instance, the foam formation can occur immediately after dissolution of polyvinyl alcohol in an aqueous solution containing a formalizing agent, formalizing catalyst and zinc chloride or acetic acid, in the reaction mixture in the course of formalization of polyvinyl alcohol, or in the polyvinyl formal solution after formalization. In brief, the forming may be effected at any time and in any manner so far as a flowable polyvinyl formal solution containing uniformly fine foam is eventually obtained.

Illustrative of some foaming procedures employable in the practice of the invention are as follows:

Into a formalization reaction mixture of polyvinyl alcohol, or a polyvinyl formal solution:

(a) a gas under high pressure is introduced by blowing and then the pressure decreased;
(b) a substance having a low boiling point such as butane, butylene, pentane, isobutylene, freon, petroleum ether, methylene chloride or ethyl ether under pressure is mixed and the mixture is heated or reduced in pressure, with the addition of a surface active agent, if necessary;
(c) a surface active agent is added, if necessary, and air or other gas is contained through agitation, preferably by a high-speed mixer, homogenizer or colloid mill;
(d) a substance which generates a gas by the action of acid, for example, sodium carbonate, sodium bicarbonate, calcium carbonate, aluminum carbonate or other carbonate, or a polysaccharide such as starch or cellulose, or metal powder, or the like is added; or
(e) an ordinary foaming agent which generates a gas by heating or by the action of a foaming promoter, for example, ammonium carbonate, sodium bicarbonate, amide carbonate derivative, urea, azodicarbonamide, benzenesulfonyl hydrazide or azobisobutyrodinitrile is added with subsequent heating and agitation.

The coagulating liquid for use in the coagulation of a polyvinyl formal solution containing foams thus prepared may be water, steam or an aqueous solution composed essentially of water, preferably of more than 60% water, for example, an aqueous solution containing a small amount of an acid such as sulfuric acid, hydrochloric acid, phosphoric acid, acetic acid or formic acid; a water-soluble salt such as zinc chloride, calcium chloride, salt cake, ammonium sulfate, aluminum chloride, sodium thiocyanate, calcium thiocyanate, sodium carbonate, caustic soda, or sodium chloride; or a water-soluble organic compound such as methanol, ethanol, butanol, isopropyl alcohol, diethylamine, dimethyl formamide, dimethyl sulfoxide, dioxane, tetrahydrofuran, ethyleneglycol, diethylene glycol, polyethylene glycol, glycerin, monochloroacetic acid, phenol or cresol. The preferred coagulating liquid is water containing a small amount of zinc chloride or acetic acid because it is easily recovered, is a solvent for polyvinyl formal, and permits the production of a porous product having an unusually high degree of porosity and gas permeability. In the practice of the invention, the coagulation can be accomplished by continuously extruding the foam-containing polyvinyl formal solution into the coagulating liquid. A coagulating temperature, for instance in the range from room temperature up to 100° C. can be employed. In general, the coagulation can be accomplished in a short period of about 2 to 30 minutes. The rate of coagulation of polyvinyl formal and the degree of porosity of the final porous product can be controlled by modifying the composition of the coagulating liquid and the temperature of the coagulating bath.

Since the polyvinyl formal solution containing foam can be shaped into many different forms such as sheets, plates, fibers, rods, bars, etc., it can be continuously brought into contact with coagulating liquid through any desired shaping means, e.g., dies or nozzles of various configurations. Thus, the process of the invention makes possible the completion of all the steps of formalization, foaming, shaping, coagulation and washing within a short cycle of 2 to 5 hours.

The polyvinyl formal porous products obtained in accordance with the invention have a developed capillary structure or continuous cellular structure, and a specific gravity ranging from about 0.05 to 0.6. A porous product of polyvinyl formal alone is in the state of a flexible sponge when moistened, but is relatively hard when dry.

As another embodiment of the invention, improved polyvinyl formal porous products are provided by adding certain fillers to the polyvinyl formal solution described above. These fillers include plasticizers, celluloses, synthetic fibers and inorganic materials. As suitable plasticizers may be mentioned, diethyl phthalate, butyl benzyl phthalate, diphenyl phthalate, dibutyl maleate, triphenyl phosphate and trioxyethylene nonylphenyl ester. Useful celluloses include cotton, cotton linter, pulp, rayon fiber, semicrystalline cellulose, acetate, sawdust, paper, and the like, in the form of short fibers, fine particles, powder or flakes. Synthetic fibers may also be cut into short lengths for use. Suitable inorganic substances include plasters (plaster of paris, gypsum, alabaster, and dead burnt gypsum), Japanese acid clay, talc, kaolin, clay, calcium silicate, aluminum silicate, magnesium silicate, calcium carbonate, zinc carbonate, magnesium carbonate, calcium oxide, calcium hydroxide, zinc oxide, magnesium oxide, alumina, silica, titanium oxide, pulverized asbestos, fibrous asbestos, glass powder, sand, diatomaceous earth, rock wool, perlite and other mineral powders. These fillers may be used singly or in combinations of two or more.

Polyvinyl formal porous products containing plasticizers are soft when dry, and the products containing celluloses have good hydroscopicity, a high degree of porosity, satisfactory strength, fine appearance and agreeable touch. Synthetic fibers serve to reinforce the porous products. Inorganic substances give heat resistance, non-inflammability and dimensional stability to the porous products. Polyvinyl formal porous products in which an inorganic substance accounts for five times as much as the polyvinyl formal content have remarkably improved heat resistance and non-inflammable properties. In applications where polyvinyl formal porous products are employed as heat insulating materials, the maximum temperature at which the products are stable for long periods of time, is in the range of about 100 to 120° C. for a porous product formed only of polyvinyl formal, and is in the range of about 140 to 160° C. for a porous product in which the content of an inorganic substance is more than five times that of the polyvinyl formal.

A very large amount of filler can be added to a polyvinyl formal solution. In general, filler may be added in an amount by weight of up to about 17 times as much as that of the polyvinyl formal. When the filler is present its weight is often at least about 0.1 times the weight of the polyvinyl formal. With products containing a high percentage of filler, the polyvinyl formal will act more as a binder. A polyvinyl formal porous product containing a filler may be produced by mixing the filler in the solution of polyvinyl alcohol to be formalized or viscous solution of polyvinyl formal formed by the formalization. The mixture is then foamed and coagulated as described above.

The filler-containing polyvinyl formal porous products obtained according to the invention may have a specific gravity of about 0.1 to 1.0 when dry, and become flexible spongy materials when dipped in water. For example, a 5 mm.-thick porous board (specific gravity) (0.68) of 10 parts of polyvinyl formal and 90 parts of plaster after bone drying had a moisture regain of 2.50% at a relative humidity of 65%; and was hard with no great flexibility. When the porous board was lightly squeezed after dipping in water, it had an absorbed water content of 120% (based on the weight of the board when bone dry) and was soft and highly flexible. The filler-containing porous products can be washed with water without fear of washing away the filler or decomposing the porous body itself.

After the coagulation, the porous products can be subjected, if desired, to coloring, coating, embossing, waterproofing, laminating, printing, compounding, softening or other various treatments. Also, colored porous products can be obtained by adding coloring agents to the polyvinyl formal solutions.

The following examples are given for a better understanding of the present invention. All parts in the examples are by weight.

EXAMPLE 1

Formalization of polyvinyl alcohol was effected in a mixture consisting of 10 parts of polyvinyl alcohol having a polymerization degree of 1700 and a saponification degree of 99.8 mol. percent, prepared by saponification of polyvinyl acetate, 4 parts of formaldehyde, 8 parts of hydrochloric acid, 30 parts of zinc chloride and 48 parts of water. When the water, hydrochloric acid, zinc chloride, formaldehyde (actually formalin was used) and polyvinyl alcohol were mixed at 60° C., the components of the reaction were completely dissolved. Formalization was effected with stirring at 60° C. for 2 hours. The formalization reaction was effected throughout in a completely homogeneous state, and a homogeneous polyvinyl formal solution was obtained after the formalization reaction.

To 100 parts of the polyvinyl formal solution resulting from the formalization reaction, 0.5 part of a surface-active agent and two parts of pulverized cotton linter were added, and the mixture was vigorously stirred at 65° C. for 20 minutes, when a white solution uniformly containing fine foam resulted. The foamed polyvinyl formal solution was wet coagulated by continuous extrusion through a slitted die having a width of 2 mm. into an aqueous coagulating bath containing 15% zinc chloride and 1% hydrochloric acid, at 70° C. After the coagulation, the sheet-like, foamed product was washed with warm water as it was passed over rollers, and then dehydrated and wound up. The foamed sheet of polyvinyl formal thus obtained had a thickness of about 3 mm. when wet and of about 2 mm. when dry. It was a fine porous product composed of a continuous cellular structure with a specific gravity of 0.18, having good water absorbability and hydrating quality. The formalization degree of the porous product was 74 mol. percent.

EXAMPLE 2

Formalization of polyvinyl alcohol was effected in a mixture consisting of 10 parts of polyvinyl alcohol having a polymerization degree of 1200 and a saponification degree of 98 mol. percent, prepared by saponification of polyvinyl acetate, 5 parts of formaldehyde, 10 parts of hydrochloric acid, 30 parts of zinc chloride and 45 parts of water. The formalization was carried out in the manner similar to that described in Example 1.

The formalization was effected for a period of 1.5 hours after dissolution of polyvinyl alcohol which was followed by the addition of formalin and hydrochloric acid. From about 30 minutes after the initiation of formalization, ammonium carbonate was added continuously in a limited amount to thereby cause foaming. In other words, the formalization and foaming were effected at the same time. In one hour and a half after the start of formalization, a polyvinyl formal solution uniformly containing fine foam was prepared. The solution containing foam after the formalization was stretched into a sheet-like form over a 200-mesh wire screen and impregnated with an aqueous solution containing 1.0% hydrochloric acid at 50° C. Coagulation was completed in about 5 minutes, and the coagulated foam was thoroughly washed with water. The porous product thus obtained had a continuous cellular structure and was soft and agreeable to touch. It had a great hydrating quality.

EXAMPLE 3

A mixture of the composition of polyvinyl alcohol (polymerization degree 1700 and saponification degree 95 mol. percent):formaldehyde:hydrochloric acid:zinc chloride:water:surface active agent at a weight ratio of 10:5:10:30:44:1 was continuously fed into a horizontal formalization reactor equipped with a stirrer and was allowed to reside in the reactor at 65° C. for 50 minutes for continuous formalization of polyvinyl alcohol. The reaction system after the formalization was a homogeneous polyvinyl formal solution. Next, the solution was continuously fed into a horizontal mixing machine, while nitrogen gas was continuously forced into the machine so that it could be dispersed uniformly in the polyvinyl formal solution thereby to prepare a foam-containing solution. The foam-containing polyvinyl formal solution thus prepared continuously was extruded through a slitted die into an aqueous coagulating bath containing 10% zinc chloride and 2% hydrochloric acid to accomplish coagulation of polyvinyl formal by a wet process. With subsequent washing and drying, a porous sheet of polyvinyl formal was obtained. The porous product obtained had a continuous cellular structure with a specific gravity of 0.15. It had good water absorbability and a good drying ratio of absorbed water.

EXAMPLE 4

Formalization of polyvinyl alcohol was effected in a mixture consisting of polyvinyl alcohol (polymerization degree 1700 and saponification degree 99.8 mol percent):formaldehyde:sulfuric acid:acetic acid:water at a weight ratio by net of 10:5:6:50:29, at 65° C. for 5 hours. After the reaction, the reaction mixture was obtained in the form of a viscous liquid containing polyvinyl formal dissolved therein homogeneously. The viscous polyvinyl formal solution was continuously fed into a high pressure mixing and kneading machine of screw extruder type, and carbon dioxide gas was forced into the machine so that the polyvinyl formal solution therein was placed under a pressure of 8 kg./cm.$^2$ and was mixed up with agitation at a rate of 75 r.p.m. at 60° C. Then, the solution was depressured by steps in a depressurer installed behind the machine, and was at the same time cooled down to 20° C. A foamed polyvinyl formal solution obtained was extruded through a linear slit die into a coagulating bath (at 45° C.) of an aqueous solution of 10% acetic acid, into a sheet form. After coagulation, the sheet was washed with water and dried, and a porous product of polyvinyl formal having a specific gravity of 0.25 and a thickness of 2.5 mm. resulted. The coagulation time required was about 5 minutes and the washing period was about 10 minutes.

EXAMPLE 5

Formalization of polyvinyl alcohol was effected in the mixture consisting of polyvinyl alcohol (polymerization degree 1200 and saponification degree 99.0 mol. percent):formaldehyde:hydrochloric acid (in terms of HCl):acetic acid:water at a weight ratio by net of 10:4:4:40:42, at 55° C. for 5 hours. After the dissolution of polyvinyl alcohol, the reaction proceeded in a homogeneous system, and a viscous solution containing polyvinyl formal homogeneously dissolved therein after the reaction was obtained. To 100 parts of this viscous polyvinyl formal solution, 2 parts of cotton linter as a foaming agent and one part of zinc chloride as a foaming promoter were added, and were mixed and kneaded together at 60° C. The mixture was foamed by carbon dioxide gas generated upon decomposition of the cotton linter, and a flowable polyvinyl formal solution homogeneously containing fine foam was obtained. The foamed solution was flowed over a glass plate into a sheet of 2.5 mm. in thickness, and was coagulated through contact with water at 50° C. The coagulation took about 5 minutes. After the coagulation, the sheet was washed with warm water and dried, and a sheet of a porous body composed essentially of polyvinyl formal, having a specific gravity of 0.35, resulted.

EXAMPLE 6

Formalization of polyvinyl alcohol was accomplished in a mixture consisting of polyvinyl alcohol (polymerization degree 1000 and saponification degree 99.6 mol. percent):formaldehyde:hydrochloric acid:zinc chloride:water at a weight ratio by net of 10:3:5:40:42, with stirring at 55° C. for 4 hours.

After the formalization, the reaction mixture was obtained as a viscous liquid in which the polyvinyl formal formed was homogeneously dissolved. To 100 parts of this viscous solution, 1.5 parts of polyester fiber cut into lengths of 5 mm. as a reinforcing material and 30 parts of Japanese acid clay as an extender were added. The mixture was thoroughly mixed and kneaded, and further 2.0 parts of pulverized cotton linter were added as a foaming agent. After sufficient agitation at 65° C., the mixture foamed and gave a flowable foamed liquid containing fillers.

The foamed liquid was extruded through a linear slit die into the form of a 5 mm.-thick board. The resultant was coagulated by impregnation in an aqueous coagulating liquid containing 15% zinc chloride and 2% hydrochloric acid at 65° C. Upon washing and drying, the board became a porous body comprising synthetic fibers for reinforcing purpose, Japanese acid clay and polyvinyl formal. The porous board had sufficient hardness and relatively great strength, and a specific gravity of 0.38.

EXAMPLE 7

Formalization of polyvinyl alcohol was effected in a mixture consisting of polyvinyl alcohol (polymerization degree 1700 and saponification degree of 99.9 mol percent):formaldehyde:sulfuric acid:acetic acid:water at a weight ratio by net of 10:5:6:50:29, with stirring at 65° C. for 5 hours.

After the formalization, the reaction mixture was obtained in the form of a colorless, transparent viscous liquid in which the polyvinyl formal produced was homogeneously dissolved. To 100 parts of this viscous liquid, 40 parts of plaster powder ($CaSO_4 \cdot 2H_2O$) as an inorganic filler were thoroughly mixed and a creamy flowable foamed liquid of polyvinyl formal was continuously prepared in the same manner as described in Example 4. The foamed liquid was continuously extruded and coagulated through a slitted die into an aqueous solution containing 15% acetic acid. After thorough washing, the product was dried. A board-like product, composed of polyvinyl formal and plaster, of good porosity and having a specific gravity of 0.35 was obtained. It had relatively good hardness and strength, and excellent heat insulation and sound-proof or sound absorption properties.

EXAMPLE 8

Formalization of polyvinyl alcohol was effected in a system consisting of polyvinyl alcohol (polymerization degree 1700 and saponification degree 99.8 mol percent): formaldehyde:sulfuric acid:zinc chloride:water at a weight ratio by weight of 10:4:6:40:40, with stirring at 60° C. for 5 hours. After the formalization, a viscous liquid in which polyvinyl formal was homogeneously dissolved resulted. To 100 parts of this solution, a plaster paste consisting of 120 parts of plaster ($CaSO_4 \cdot 2H_2O$), 30 parts of zinc chloride and 40 parts of water was added and mixed and kneaded together. A flowable viscous liquid was thus prepared. A pressure of 20 kg./cm.$^2$ was applied to the viscous solution while being agitated. At the same time a controlled amount of compressed carbon dioxide gas was forced into the solution. After agitation at 150 r.p.m., the solution was depressed gradually in multi-stage fashion so that it could be foamed and thus a polyvinyl formal solution containing uniform fine foam was continuously prepared.

Next, the foamed liquid was extruded through a slitted die into an aqueous solution of zinc chloride in a concentration of 15%, at 60° C. into a board-like form. Upon wet coagulation, a board-like porous product was obtained.

After washing and drying the porous board had a thickness of about 6 mm. and a density of 0.54. The porous board had relatively good hardness and tenacity and also sufficient non-inflammability because of the presence of the inorganic filler.

EXAMPLE 9

To 10 parts of the viscous polyvinyl formal solution obtained after the formalization as employed in Example 8, 0.3 part of cotton linter was added and the mixture was agitated at 60° C., when the cotton linter was partially decomposed by the acid and gradually generated carbon dioxide gas. The resulting solution was continuously extruded through a slit into an aqueous solution containing 0.5% hydrochloric acid at 60° C. and was wet coagulated. After washing and drying, the product was a porous board composed essentially of polyvinyl formal containing cotton linter, which had a thickness of 5 mm. and a density of 0.18.

This porous board was a hard foamed body of a continuous cellular structure. It possessed excellent sound-absorbing properties, and exhibited good moisture absorption and hydrating properties in air. For example, at relative humidities of 45%, 65% and 85% at 25° C., the product had moisture regains of 3.3%, 8.1% and 13.8% respectively, indicating that it was relatively quickly changeable reversibly with the change of atmospheric moisture and that it was capable of responding to humidity changes.

EXAMPLE 10

Formalization of polyvinyl alcohol was effected in a moisture consisting of polyvinyl alcohol (polymerization degree 1200 and saponification degree 99.8 mol. percent):formaldehyde:sulfuric acid:acetic acid:water at a weight ratio by net of 10:5:6:49:30, with stirring at 60° C. for 6 hours. To 100 parts of the colorless and transparent viscous solution of polyvinyl formal thus obtained, a plaster paste consisting of 100 parts of plaster, 30 parts of acetic acid and 40 parts of water was added and kneaded together. The mixture was continuously fed into a high pressure machine of cylindrical type equipped with an agitating and kneading means. The pressure inside the machine was increased to 30 kg./cm.$^2$, and compressed carbon dioxide gas was forced under a certain pressure into the mixture while being stirred at 100 r.p.m. Next, the mixture charged with the gas was continuously fed into a multi-stage depressuring machine so that it could be depressured by steps and foamed. A flowable foamed solution containing polyvinyl formal and a large amount of plaster was prepared. It was then formed into a board by extrusion through a linear slit die into an aqueous solution of acetic acid in a concentration of 15% and was coagulated. After thorough washing with warm water, squeezing by rollers, and drying, a porous board of a continuous cellular structure 6 mm. in thickness and 30 cm. in width, and a specific gravity of 0.48, having relatively good hardness and strength, was obtained. By the analysis of the components the product was found to be composed of 9.5 parts of plaster for one part of polyvinyl formal.

This porous body had good non-inflammability, moisture absorption and hydrating property and sound-proof or sound absorption. It was a soft sponge when impregnated with water.

EXAMPLE 11

Formalization of polyvinyl alcohol was effected in a mixture consisting of polyvinyl alcohol:formaldehyde:sulfuric acid:zinc chloride:water at a weight ratio by net of 10:3:5:42:40, with thorough stirring at 55° C. for 5 hours. To 100 parts of the viscous solution of polyvinyl formal thus obtained was added a mixture consisting of 70 parts of plaster, 20 parts of zinc chloride, 30 parts of water and 3 parts of polyvinyl chloride staple fibers as a reinforcing additive. The whole mixture was thoroughly mixed and kneaded and was foamed in the same way as in Example 10. The foamed solution thus obtained was formed into a board by extrusion into an aqueous coagulating bath containing 15% zinc chloride and 1% sulfuric acid. After washing and drying, a porous board was obtained. The product had a thickness of about 7 mm. and a specific gravity of 0.36 and was composed of 10 parts polyvinyl formal and 70 parts plaster. The board was a porous body fairly hard and strong, and flexible in moistened condition.

EXAMPLE 12

Formalization of polyvinyl alcohol was effected in a mixture consisting of polyvinyl alcohol (polymerization degree 1700):formaldehyde:sulfuric acid:acetic acid: water at a weight ratio by net of 10:5:6:50:29, with stirring at 65° C. for 5 hours. After the formalization, the reaction mixture was obtained as a viscous solution in which polyvinyl formal formed was homogeneously dissolved. This viscous solution was continuously fed into a pressure mixing machine of the cylindrical type equipped with a powerful mixing and kneading means. Simultaneously, carbon dioxide gas was forced in the machine and the charge was agitated at a rate of 120 r.p.m. while the pressure inside the machine was kept at 10 kg./cm.$^2$. The polyvinyl formal solution was then depressed and cooled down to room temperature by a multi-stage depressuring machine, was wet spun by extrusion through a spinning nozzle having 500 holes each 0.8 mm. in diameter, and coagulated in an aqueous solution containing 10% acetic acid (at 45° C.). The spinning was carried out smoothly, though considerable foaming at the coagulating bath was observed around the spinning nozzle. After being taken out of the coagulating bath at a rate of 8 meters per minute, the filament was stretched 3 times as long as original length in water at 60° C. and then was wound up. The filament thus obtained was a porous filament having a mono-filament fineness of about 30 deniers and had an apparent specific gravity of about 0.42.

EXAMPLE 13

Formalization of polyvinyl alcohol was carried out in a mixture consisting of polyvinyl alcohol:formaldehyde: hydrochloric acid:zinc chloride:water at a weight ratio by net of 10:3:5:40:42, with stirring at 55° C. for 4 hours. To 100 parts of this viscous solution of polyvinyl formal thus obtained, one part of melamine resin as a hardening agent was added. After the mixture was stirred to form a homogeneous solution, 2 parts of pulverized cotton linter was added and thoroughly kneaded together at 65° C. The mixture was foamed by carbon dioxide gas generated upon decomposition of the cotton linter. Thus, a flowable foamed polyvinyl formal solution resulted in which melamine resin as a filler was homogeneously dissolved. This solution was extruded through a spinning nozzle having a hole diameter of 1.0 mm. into water at 60° C., and a porous filament formed essentially of polyvinyl formal and melamine resin was obtained.

The embodiments of the invention in which an exclusive property or privilege is claimed are defined as follows:

1. A process for the production of polyvinyl formal porous products which comprises reacting polyvinyl alcohol with formaldehyde in an aqueous solution containing formaldehyde, an inorganic acid catalyst and a substance selected from the group consisting of zinc chloride and acetic acid to provide a homogeneous solution of polyvinyl formal, introducing a gas into the polyvinyl formal solution to provide a flowable, polyvinyl formal solution containing a fine foam and thereafter contacting the foam-containing polyvinyl formal solution with an aqueous coagulating liquid consisting essentially of water to coagulate the polyvinyl formal.

2. The process of claim 1 wherein the gas is introduced after the reaction of polyvinyl alcohol with formaldehyde has been effected.

3. The process of claim 1 wherein a filler is added to the reaction mixture, such that the product has a specific gravity of about 0.1 to 1.0.

4. The process of claim 3 wherein the filler is an inorganic material.

5. The process of claim 4 wherein the weight of the filler is about 0.1 to 17 times the weight of the polyvinyl formal.

6. The process of claim 1 wherein the polyvinyl alcohol is present in a concentration of about 5 to 25 weight percent and the zinc chloride or acetic acid is present in an amount of about 30 to 70 weight percent.

7. The process of claim 1 wherein the formaldehyde is generated by a substance selected from the group consisting of formalin, trioxane, paraformaldehyde and polyoxymethylene glycols.

8. The process of claim 1 wherein the inorganic acid catalyst is selected from the group consisting of sulfuric acid and hydrochloric acid.

9. A process for the production of polyvinyl formal porous products which comprises reacting about 5 to 25 weight percent, based on the weight of the total solution, of polyvinyl alcohol with formaldehyde in an aqueous solution containing about 1 to 10 weight percent of formaldehyde, about 2 to 12 weight percent of an inorganic acid catalyst and about 30 to 70 weight percent of a substance selected from the group consisting of zinc chloride and acetic acid to provide a homogeneous solution of polyvinyl formal, introducing a gas into the polyvinyl formal solution to provide a flowable, polyvinyl formal solution containing a fine foam and thereafter contacting the foam-containing polyvinyl formal solution with an aqueous coagulating liquid consisting essentially of water to coagulate the polyvinyl formal.

10. The process of claim 9 wherein the formaldehyde is generated by a substance selected from the group consisting of formalin, trioxane, paraformaldehyde and polyoxymethylene glycols.

References Cited

UNITED STATES PATENTS

| 2,333,804 | 11/1943 | Malm et al. | 260—73L |
| 2,457,261 | 12/1948 | Morrison et al. | 260—73L |
| 2,609,347 | 9/1952 | Wilson | 260—2.5F |
| 2,653,917 | 9/1953 | Hammon | 260—2.5F |
| 2,664,366 | 12/1953 | Wilson | 260—2.5F |

MURRAY TILLMAN, Primary Examiner

M. FOELAK, Assistant Examiner

U.S. Cl. X.R.

260—17.4, 30.6, 31.2, 31.8, 41, 73